July 14, 1959
A. WILLIAMS
2,894,576
ADJUSTABLE GLARE SHIELDS AND MIRROR
ATTACHMENTS FOR AUTOMOBILE VISORS
Filed June 3, 1957
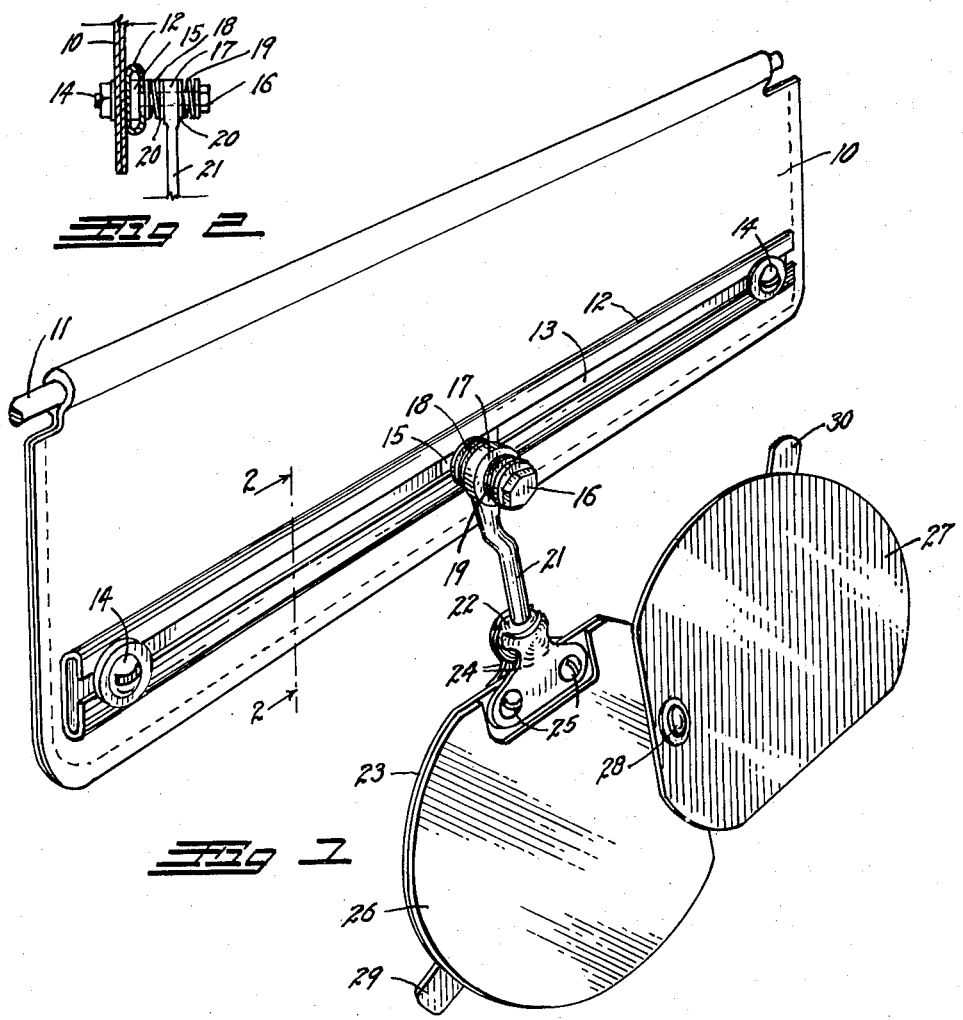
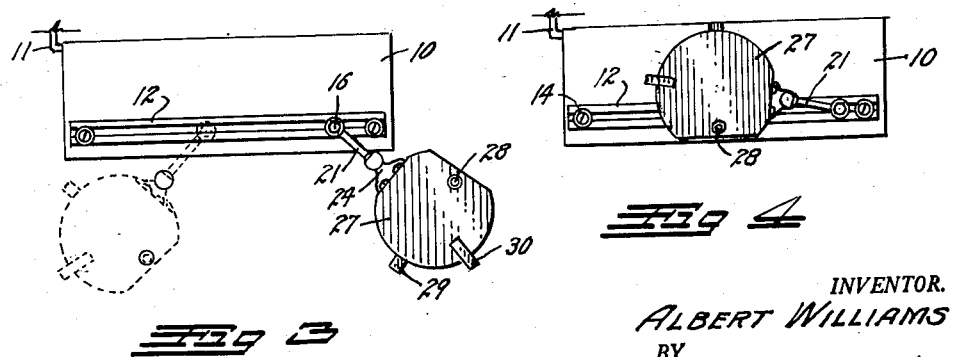
INVENTOR.
ALBERT WILLIAMS
BY
ATTORNEY

United States Patent Office 2,894,576
Patented July 14, 1959

2,894,576

ADJUSTABLE GLARE SHIELDS AND MIRROR ATTACHMENTS FOR AUTOMOBILE VISORS

Albert Williams, Lafayette, Colo.

Application June 3, 1957, Serial No. 663,179

1 Claim. (Cl. 160—220)

This invention relates to an adjustable glare shield and mirror attachment for automobile visors. The usual automobile visor has a limited area of glare protection. Occasionally, this is not sufficient to protect the driver from the sun's rays or the beams of approaching head lights. To construct a visor of sufficient dimensions to cover all possibilities would be impractical. The principal object of this invention is to provide an auxiliary glare shield which can be quickly and easily attached to the conventional automobile visor, and which can be quickly and easily adjusted to any desired position about the periphery of the visor to increase the area of the shielding effect.

Another object of the invention is to provide an auxiliary shield attachment for automobile visors which can be also employed as either a rear view mirror or a vanity mirror, and in which the angle of the mirror can be quickly and easily adjusted to provide a view toward the rear and at either side of the automobile to detect approaching and passing vehicles.

A further object of the invention is to provide a protecting shield for a mirror attachment for automobile visors which can be adjusted to prevent glare from the mirror from interfering with the driver's vision.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a perspective view of a conventional automobile visor, with the improved shield attachment in place thereon;

Fig. 2 is a detail cross-section, taken on the line 2—2, Fig. 1; and

Figs. 3 and 4 are diagrammatic views illustrating various positions of adjustment of the improved shield attachment.

In the drawing, a conventional automobile visor is illustrated at 10 hingedly mounted upon the usual swinging visor rod 11. This invention is designed for attachment to the rear or upper face of the visor 10.

The invention comprises a channel track member 12 having a longitudinally extending open guide slot 13. The track member is attached to the visor 10 by means of suitable bolts 14 which extend through openings drilled or punched in the visor 10, and which are secured in place thereon by means of conventional bolt nuts.

A slide block 15 is positioned in the channel track member so that it may be slid longitudinally thereof. A mounting screw 16 is threaded into the block 15, or is otherwise suitably mounted thereon so that it will project forwardly therefrom through the guide slot 13.

An arm pad 17 is rotatably mounted upon the screw 16 and is frictionally held in any desired circumferential position thereon by means of a rear compression spring 18 and a forward compression spring 19 which act to urge friction washers 20 against the opposite sides of the pad 17. The springs 18 and 19 also act to resiliently maintain the slide block 15 in frictional engagement with the channel track member 12 so that it will maintain any desired preset position longitudinal of the visor 10.

A bracket arm 21 is formed on, or otherwise secured to, the pad 17 and projects radially therefrom. The bracket arm terminates in a joint ball 22 upon which a relatively flat shield plate 23 is universally mounted. As illustrated, the ball 22 is frictionally clamped between two socket plates 24, and the socket plates are secured upon the forward and rear faces of the shield plate 23 by means of suitable attachment screws 25.

A mirror 26 is mounted on one face of the shield plate 23. The mirror may be a separate unit cemented or otherwise secured to the shield plate 23, or it may be, if desired, a reflecting surface formed upon the shield plate 23 itself.

An opaque mirror cover plate 27 is pivotally mounted to the shield plate 23 at one side of the mirror upon a suitable pivot rivet 28 so that it may be swung across to completely cover the reflecting surface of the mirror 26, or to one side of the mirror to increase the shielding area of the shield plate 23.

The shield plate 23 is provided with a suitable finger grip 29, and the cover plate 27 is provided with a similar finger grip 30 to facilitate swinging them about their respective pivots.

When the visor 10 is not in use, the entire attachment can be swung to a flat position on the rear or upper surface of the visor, as shown in Fig. 4. Should objectionable light rays pass below the visor 10, the shield plate 23 may be swung downwardly and slid along the track member 12 to a position to obstruct the rays, as shown in Fig. 3. The width of the shield plate 23 can be increased by swinging the cover plate 27 to the open position of Fig. 1, or it may be used in the closed position of Figs. 3 and 4.

It can be seen that the mirror 26 can be turned about the axis of the ball 22 to provide a view to either side of the rear of the car. If glaring lights are reflected in the mirror, these may be shielded out by simply swinging the cover plate 27 across the mirror.

While a specific form of the improvement has been described and illustrated herein, it is to be understood that the same may be varied, within the scope of the appended claim, without departing from the spirit of the invention.

Having thus described the invention, what is claimed and desired secured by Letters Patent is:

An adjustable glare shield comprising: a movable automobile visor horizontally pivoted at its upper edge; a channel track member having a longitudinally extending open slot in its outer face; means securing said track member horizontally on the rear face of and extending along the lower edge of said visor, with the slot therein facing rearwardly; a slide member mounted to move longitudinally in said channel track member; a mounting screw threaded through said open slot and into said slide member; a bracket arm rotatably mounted on said mounting screw; a glare shield plate connected by a ball and socket universal joint to said bracket arm; a spring-loaded friction element acting to both frictionally resist rotation of said bracket arm on said mounting screw and to simultaneously and resiliently maintain the bracket arm at any desired angle on said mounting screw and the slide member at any desired preset position along said track member, and a cover plate pivotally mounted on on side of said shield plate for swinging movement to expose or cover a selected area of said shield plate.

References Cited in the file of this patent

UNITED STATES PATENTS

| | | |
|---|---|---|
| 1,358,159 | Kern | Nov. 9, 1920 |
| 1,419,322 | Smith | June 13, 1922 |
| 1,628,704 | Zartman | May 17, 1927 |
| 1,797,801 | Souder | Mar. 24, 1931 |
| 1,814,500 | Summerbell | July 14, 1931 |